Patented Nov. 22, 1949

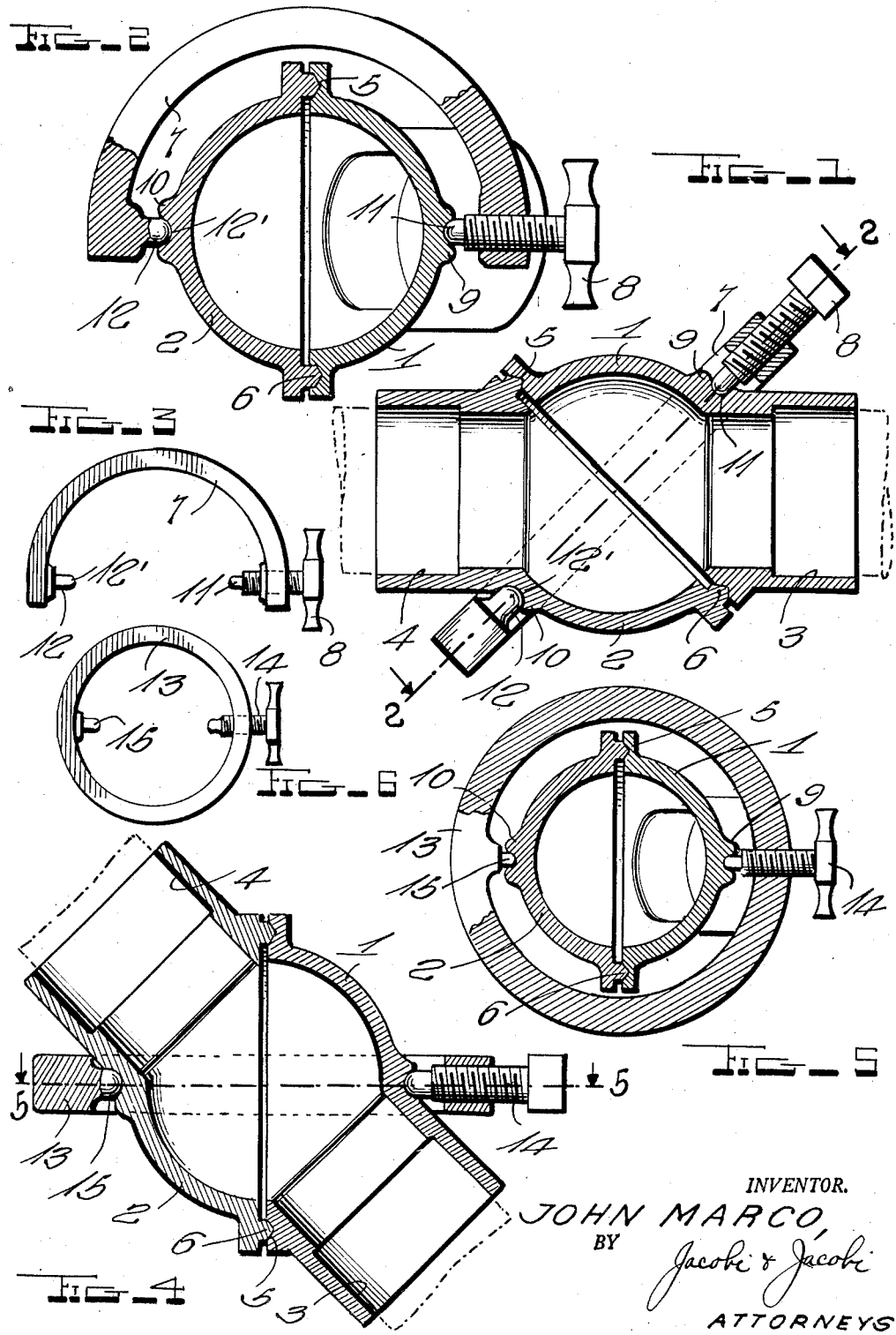

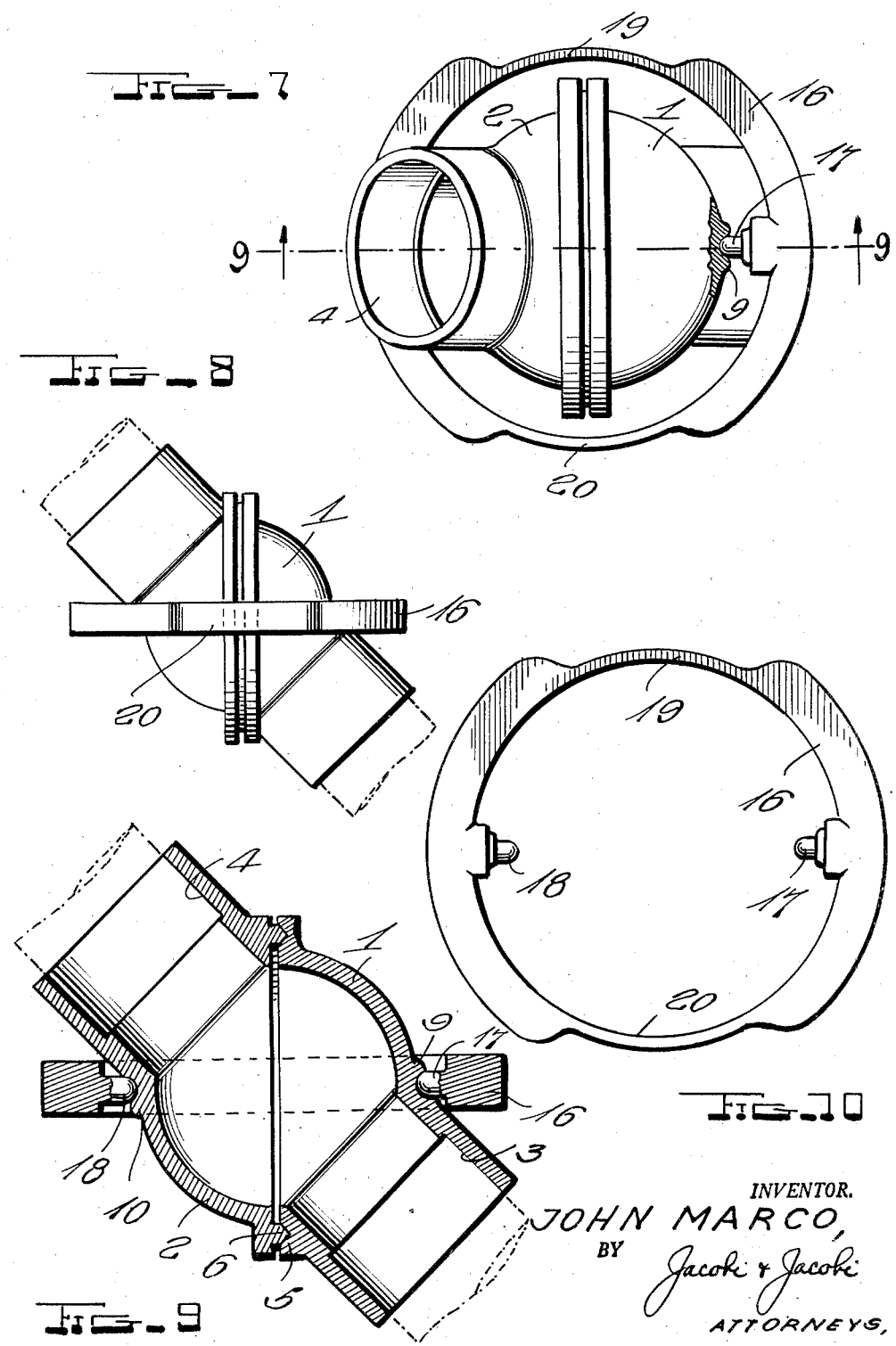

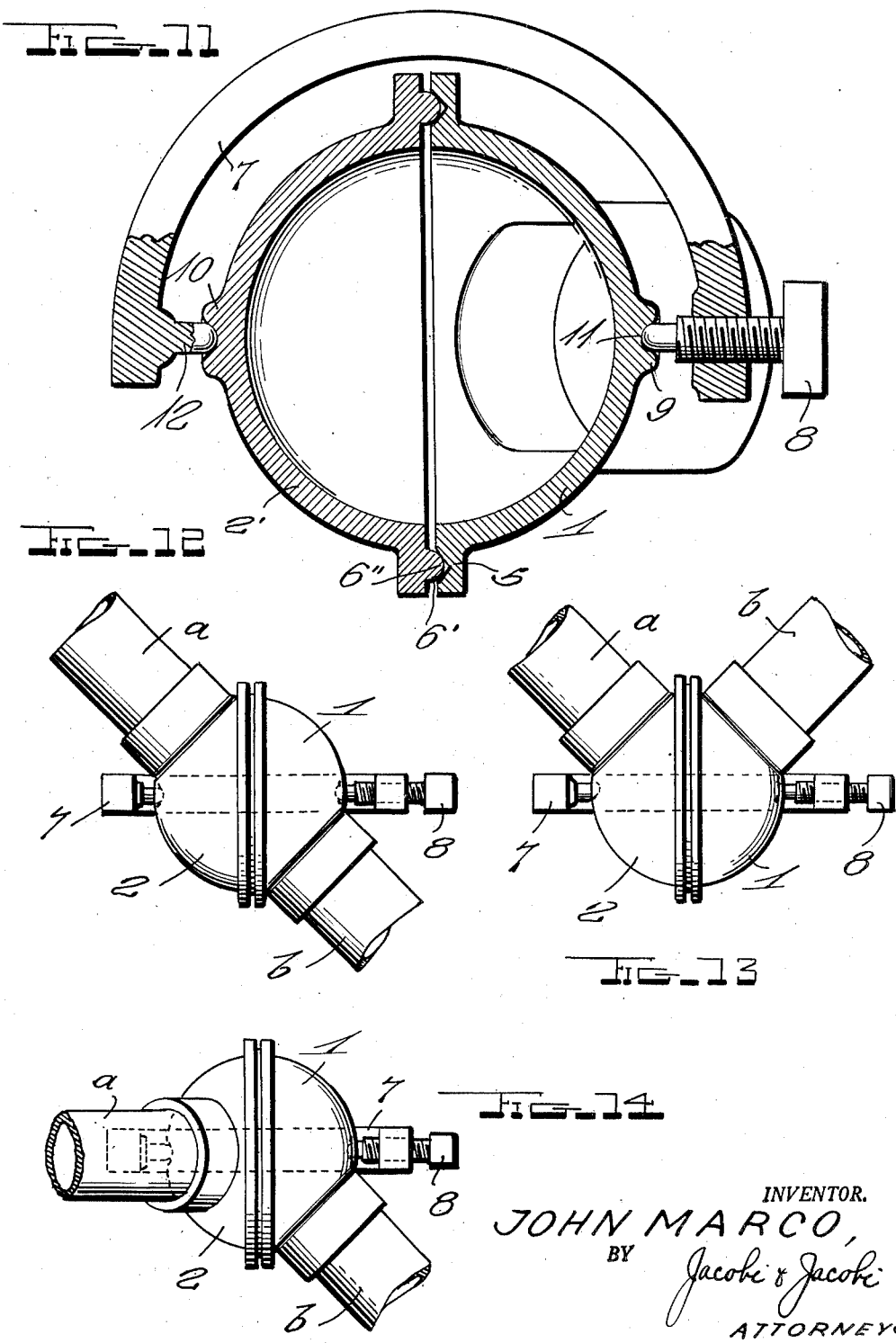

2,489,100

UNITED STATES PATENT OFFICE 2,489,100

DETACHABLE AND ADJUSTABLE PIPE COUPLING

John Marco, Wilmington, Del.

Application November 14, 1946, Serial No. 709,847

3 Claims. (Cl. 285—64)

My invention relates to pipe couplings that may be readily assembled and disassembled for cleansing and sterilizing purposes. The coupling is also angularly adjustable so that angularly related pipes may be readily connected in a suitable leak proof manner. The coupling is intended for use primarily in food treating machinery, chemical apparatus, etc., but may be used generally wherever an adjustable detachable coupling is needed.

It is an object of my invention to provide an unique pipe coupling comprising a minimum number of parts not requiring a gasket for successful operation, but requiring mated parts comprising interfitting sealing ribs and grooves forced together by an embracing yoke clamp construction to provide a leak proof joint.

It is also an object of my invention to provide in combination with my coupling a clamping yoke construction that may be applied without the aid of tools.

Other objects and advantages will be revealed in the detailed description of the drawings which form a part of this specification.

In the drawings:

Figure 1 is a longitudinal sectional view of my new coupling;

Figure 2 is a transverse sectional view of the same taken substantially on line 2—2 of Figure 1, looking in the direction indicated by the arrows;

Figure 3 is an elevational view of clamping yoke construction;

Figure 4 is a longitudinal sectional view displaying the use of a ring shaped clamping yoke;

Figure 5 is a transverse sectional view taken substantially on the line 5—5 of Figure 4;

Figure 6 is an elevational view of a ring shaped clamping yoke on a reduced scale;

Figure 7 is a plan view partly in section of my new pipe coupling displaying a clamping yoke having resilient portions therein;

Figure 8 is a side elevational view of Figure 7 on a reduced scale;

Figure 9 is a longitudinal section of Figure 7 taken substantially on the line 9—9 of said figure;

Figure 10 is a plan view of the ring shaped yoke, on an enlarged scale, and displays the clamping yoke of Figures 7, 8 and 9.

Figure 11 is a transverse sectional view displaying a circular groove angular in cross section receiving a circular rib having a rounded face portion making a two line contact with the angular groove; and Figures 12, 13 and 14 are elevational views of different positions of adjustment of my new coupling.

The drawings are merely illustrative of my new pipe coupling and not definite thereof except as pointed out in the claims herein.

The reference characters identify the parts and details in both the drawings and the written description.

My coupling, as illustrated in Figures 1, 2 and 3, comprises tubular sections 1 and 2 having stepped enlargments 3 and 4 adapted to receive pipe ends fitted therein and secured thereto by sweating, brazing or welding. The pipes secured in the stepped enlargements are shown in dotted lines in Figures 1, 4, 8 and 9 and are shown in full lines in Figures 12, 13 and 14 and are indicated by $a$ and $b$.

Each section is provided, preferably with a hemispherical portion terminating in coplanar concentric areas defining a plane substantially forty-five degrees to the lineal axis of its section.

In section 1, the coplanar areas are spaced or separated by a circular groove 5 angular in cross section and adapted to receive the complemental face of a circular rib 6 of angular cross sectional on section 2. The coplanar faces of section 2 are separated by the rib 6.

The interfitting rib and groove construction forms a seal which when tightly clamped together by the arcuate yoke 7 having the winged bolt 8 becomes a locked seal. Each section is provided with a recessed boss 9 and 10, respectively, to receive the rounded end 11 of the bolt 8 and the rounded end $12^1$ of the stud 12. The stud 12 and the bolt 8 are in substantial alignment.

The line joining the axes of the stud and bolt is substantially at right angles to the coplanar concentric areas and passes through the center of the circles defined by the coplanar areas. This particular construction produces equalized pressure on all portions of the seal and locks all portions of the seal in liquid tight contact.

My invention as illustrated in Figures 4, 5 and 6 is identical with the construction displayed in Figures 1, 2 and 3 except that the arcuate yoke 13 forms a complete ring or circle. The complete circle provides for the use of lighter stock material than the stock material necessary in yoke 7. The yoke 13 is provided with the usual winged bolt 14 and the usual stud 15. When using the yoke 13, it must be located on one of the sections before assemblage, so that it may be brought into proper clamping relation to the sections 1 and 2.

Figures 7, 8, 9 and 10 are identical with Figures 1, 2 and 3 except that the arcuate clamping yoke 16 is a complete ring or circle having two diametrically aligned opposed studs 17 and 18, preferably, integral with the yoke 16. The yoke 16 is also provided with resilient portions 19 and 20 arranged in opposed relation to each other and are, preferably, integral with the yoke 16. The yoke 16 is resilient and is snapped into clamping relation with the sections 1 and 2. The clamping operation is accomplished by centering one stud in one of the recessed bosses and then snapping the other stud into the other recessed boss by a lateral pull combined with a transversely applied pressure component toward the free section until the remaining stud snaps into the remaining recessed boss. In this connection it will be noted that the recessed bosses 9 and 10 are provided with tapered sides tapering upwardly and inwardly toward the axes of the bosses and defining a camming surface over which the rounded ends of the studs 17 and 18 may be guided to snap-in position of the cooperating stud and recessed boss.

Figure 11 is identical with Figures 1, 2 and 3 except that section $2^1$ is provided with a rib $6^1$ having a rounded face $6^{11}$ received in an annular groove 5 and making a two line sealing contact with the walls of the groove 5 which is angular in cross section.

Figures 12, 13 and 14 illustrate the angular adjustment that may be made with my coupling sections. Figure 12 displays an adjustment of 180° or a straight angle. Figure 13 displays an adjustment comprising a 90° angle or a right angle. Figure 14 displays one of a multiplicity of selected adjustments that may be made between the straight angle of Figure 12 and the right angle adjustment of Figure 13.

The rib and groove contact illustrated in all of the figures except Figure 11 may be said to have a ground-in fit, i. e., the complemental rib and groove may be ground-in together by the use of a fine or very fine abrasive powder. The complemental rib and groove structure of Figure 11 represents an accurate finish by a machine.

Although I have illustrated three varieties of arcuate clamping yokes, it is observed that they are interchangeable, i. e. any one may be substituted for either of the other varieties. From this observation it follows that my sectional coupling has universal application to every variety of clamping yoke disclosed by me.

It can now be understood that I have provided an extremely simple pipe coupling composed primarily of three parts that may be readily assembled and disassembled for cleansing, sterilizing, etc.

It will be seen from the foregoing description that I have provided a comparatively simple, inexpensive and efficient means for carrying out the various objects of the invention and while I have described the elements best adapted to perform the functions set forth, it is apparent that various changes in form, proportion and in the minor details of construction may be resorted to, without departing from the spirit or sacrificing any of the principles of the invention.

Having thus described my invention, what I claim is:

1. An adjustable coupling, said coupling comprising a minimum of three separable parts, said parts comprising two tubular sections and a resilient clamping yoke, each section having spaced concentric coplanar areas arranged at substantially a forty-five degree angle to the axis of its section, one section being provided with an annular grooved portion located between its concentric areas, the grooved portion being angular in cross section, the other section having an annular rib located between its concentric coplanar areas, said rib having, in cross section, a rounded face portion being received by said annular grooved portion and making a two line sealing contact therewith, said sections having recessed bosses arranged in opposed relation to each other and being in a line substantially at right angles to the planes defined by the concentric coplanar areas, in combination with said clamping yoke, said yoke having studs engaging said recessed bosses and maintaining said sections in sealed relation to each other each stud being substantially rigid and integrally connected with said yoke.

2. In an adjustable pipe joint, comprising separable cooperating sections adapted to be maintained in fluid proof contact with each other, each of said sections having a recessed boss, said bosses being arranged in opposed aligned relation, in combination with a resilient clamping yoke, engaging said bosses, said yoke having studs therein arranged in opposed aligned relation, said yoke comprising a complete ring having thin resilient sections and thick substantially rigid sections, said last named sections being integrally connected together, one stud being located on each of said rigid sections, whereby one stud may be snapped into one recessed boss while the other stud is maintained in the opposed recessed boss.

3. An adjustable pipe coupling, said coupling comprising two tubular sections, each section having coplanar concentric areas defining substantially parallel planes, said planes being substantially at an angle of forty-five degrees to the axis of its own tubular section, one section having an annular groove located between said concentric areas, said groove being angular in cross section, said other section having an annular rib located between the coplanar concentric areas of its section, said rib having its outermost portion rounded in cross section to form a rounded face portion received by said angular groove and forming a fluid sealing contact therewith along two parallel circular lines, in combination with a clamping yoke engaging said sections and maintaining them in fluid sealing relation with each other, each section being provided with a recessed boss, said yoke being provided with opposed studs having rounded ends, said ends engaging said bosses to aid in maintaining said yoke in clamping position on said sections, said yoke comprising a complete ring having thin resilient sections and thick substantially rigid sections, said last named sections being integrally united, said studs being located on the rigid sections, whereby one stud may be snapped into one recessed boss while the other stud is located in the opposed recessed boss.

JOHN MARCO.

REFERENCES CITED

The following references are of record in the file of this patent:

UNITED STATES PATENTS

| Number | Name | Date |
| --- | --- | --- |
| 97,963 | Reed | Dec. 14, 1869 |
| 227,148 | Clark | May 4, 1880 |
| 748,807 | Spratt | Jan. 5, 1904 |
| 2,238,462 | Crepeau | Apr. 15, 1941 |